US011111040B2

(12) United States Patent
Enderle et al.

(10) Patent No.: US 11,111,040 B2
(45) Date of Patent: Sep. 7, 2021

(54) PACKAGING MACHINE WITH PRESSURE CONTROL DEVICE AND METHOD

(71) Applicant: Multivac Sepp Haggenmüller SE & Co. KG, Wolfertschwenden (DE)

(72) Inventors: Tobias Enderle, Bad Grönenbach (DE); Thomas Holderied, Dietmannsried (DE); Herbert Kirmse, Wolfertschwenden (DE); Daniel Honold, Marktoberdorf (DE); Michael Rädler, Kempten (DE); Florian Felch, Durach (DE); Peter Schrade, Bad Urach (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 178 days.

(21) Appl. No.: 16/241,248

(22) Filed: Jan. 7, 2019

(65) Prior Publication Data
US 2019/0210750 A1 Jul. 11, 2019

(30) Foreign Application Priority Data

Jan. 8, 2018 (DE) .......................... 102018100224.6

(51) Int. Cl.
*B65B 31/00* (2006.01)
*B65B 57/00* (2006.01)
(Continued)

(52) U.S. Cl.
CPC .............. *B65B 31/00* (2013.01); *B65B 9/04* (2013.01); *B65B 31/02* (2013.01); *B65B 31/028* (2013.01); *B65B 57/00* (2013.01); *G05D 16/204* (2013.01)

(58) Field of Classification Search
CPC ............ B65B 31/00; B65B 9/04; B65B 31/02; B65B 31/028; B65B 57/00; G05D 16/204
See application file for complete search history.

(56) References Cited

U.S. PATENT DOCUMENTS 4,241,750 A * 12/1980 Furuse ................. G05D 16/204
137/101.19
4,487,187 A * 12/1984 Petro .................. F02M 21/0284
123/478

(Continued)

FOREIGN PATENT DOCUMENTS

EP 1595794 A1 * 11/2005 ............. B65B 31/02
EP 1772663 A1 4/2007
(Continued)

*Primary Examiner* — Nathaniel C Chukwurah
*Assistant Examiner* — Lucas E. A. Palmer
(74) *Attorney, Agent, or Firm* — Brooks Kushman P.C.

(57) ABSTRACT

A packaging machine with an atmosphere modifying station in which an atmosphere within a packaging to be produced can be modified by evacuating air and/or introducing a gas. The packaging machine has a pressure control device that may control an evacuation pressure and/or a gassing pressure. The pressure control device may comprise a first controllable 2/2-way valve and a second controllable 2/2-way valve, both which are configured to influence the evacuation pressure and/or the gassing pressure by setting a volume flow. The first and second 2/2-way valves are connected in parallel with one another and are controllable independently of one another. In one embodiment, the first and second 2/2-way valves are preferably electrically controllable. A method of modifying an atmosphere within a package using a packaging machine and pressure control device is also provided.

24 Claims, 2 Drawing Sheets

(51) Int. Cl.
*G05D 16/20* (2006.01)
*B65B 31/02* (2006.01)
*B65B 9/04* (2006.01)

(56) References Cited

U.S. PATENT DOCUMENTS

| | | | | |
|---|---|---|---|---|
| 6,112,506 | A * | 9/2000 | Eberhardt, Jr. | B65B 25/067 53/510 |
| 8,623,457 | B2 * | 1/2014 | Ashizawa | H01L 21/67196 427/255.28 |
| 9,902,509 | B2 * | 2/2018 | Schiavina | B29C 65/7451 |
| 2003/0070724 | A1 * | 4/2003 | Shock | F17C 13/023 141/83 |
| 2005/0087238 | A1 * | 4/2005 | Wilson | G05D 16/204 137/599.07 |
| 2007/0079892 | A1 * | 4/2007 | Cohen | G05D 16/204 141/105 |
| 2009/0071100 | A1 * | 3/2009 | Ehrmann | B65B 9/04 53/84 |
| 2009/0173049 | A1 * | 7/2009 | Ruzic | B65B 65/00 53/542 |
| 2009/0182457 | A1 * | 7/2009 | Huang | G05D 16/204 700/282 |
| 2011/0272048 | A1 * | 11/2011 | Glaeser | F17C 5/06 137/613 |
| 2012/0144785 | A1 * | 6/2012 | Vaccari | B65G 25/02 53/510 |
| 2014/0020338 | A1 * | 1/2014 | Hubner | B65B 59/003 53/453 |
| 2016/0068292 | A1 * | 3/2016 | Fries | B65B 51/10 53/559 |
| 2016/0068293 | A1 * | 3/2016 | Cutting | A61J 1/10 53/432 |
| 2017/0172352 | A1 * | 6/2017 | Bokma de Boer | B65D 85/70 |
| 2019/0072989 | A1 * | 3/2019 | Nagai | G05D 16/204 |

FOREIGN PATENT DOCUMENTS

| | | | |
|---|---|---|---|
| EP | 2011734 B1 | 3/2011 | |
| JP | 2010013147 A * | 1/2010 | |
| JP | 2010013147 A | 1/2010 | |
| WO | 2013144598 A1 | 10/2013 | |
| WO | 2014173802 A1 | 10/2014 | |
| WO | 2015169830 A1 | 11/2015 | |
| WO | WO-2015169830 A1 * | 11/2015 | ............... B65B 9/04 |

* cited by examiner

PACKAGING MACHINE WITH PRESSURE CONTROL DEVICE AND METHOD

CROSS-REFERENCE TO RELATED APPLICATIONS

This Application claims priority to German Patent Application No. 102018100224.6 filed on Jan. 8, 2018 to Tobias Enderle, Thomas Holderied, Herbert Kirmse, Daniel Honold, Michael Rädler, Florian Felch and Peter Schrade, currently pending, the entire disclosure of which is incorporated herein by reference.

FIELD OF THE INVENTION

The invention refers to a packaging machine having a pressure control device for modifying an atmosphere of a package and a method of using such packaging machine.

BACKGROUND OF THE INVENTION

For example, a generic packaging machine is known from EP 2 011 734 B1. The atmosphere of the packaging to be produced can be specifically modified by such packaging machines, for example to increase the shelf life or the appearance of the products contained in the packaging or to increase the stability of the packaging itself. In particular, a vacuum can be created within the packaging or the packaging can be filled with a suitable gas which may displace other gases possibly present in the packaging. When evacuating and/or replacing the gases present in the packaging, the contents of the packaging shall be preserved as far as possible. In particular, it must be ensured that lighter components of the contents of the packaging, such as flour or other powders or liquids, are not stirred up by the evacuation and/or gassing air flow. At the same time, however, the time required for gas exchange or evacuation must be minimized in order to increase the efficiency of the packaging process. EP 2 011 734 B1 proposes a proportional controller to resolve this conflict. However, this solution also leaves room for improvement.

SUMMARY OF THE INVENTION

Consequently, it is an object of this invention to provide a packaging machine that is improved in terms of efficiency and protection of the contents of the packaging by measures that are constructively as simple as possible.

The invention provides for a packaging machine with an atmosphere modifying station by which an atmosphere within a package to be produced can be modified by evacuation and/or gassing. To modify the atmosphere, the packaging machine may be equipped with a pressure control device which may be configured to control an evacuation pressure and/or a gassing pressure. The invention is characterized in that the pressure control device may comprise a first preferably electrically controllable 2/2-way valve and a second preferably electrically controllable 2/2-way valve, which are configured to influence the evacuation pressure and/or the gassing pressure by setting a volume flow, wherein the first and the second 2/2-way valves are connected in parallel with one another and are individually controllable.

In the sense of the invention, any work station of a packaging machine may be regarded as an atmosphere modifying station which specifically modifies the atmosphere or the gaseous content of the packaging. In particular, this may be an evacuation or gassing process. Gassing may be understood in particular as a flushing with an exchange gas, the inflow of a suitable gas after an evacuation or corresponding processes with a gas mixture. However, the simple evacuation or vacuuming of the packaging may also be regarded as a modification in the atmosphere. In the following, the terms "evacuation pressure" and "gassing pressure" are understood as the pressure prevailing or to be generated within the packaging. According to general knowledge, a 2/2-way valve may be a valve with two connections and two valve positions. In particular, a valve having a valve inlet and a valve outlet and allowing flow between the valve inlet and outlet in a first valve position and blocking such flow in a second valve position. Controlling the valve may be interpreted as causing the valve to switch from the first valve position to the second valve position or vice versa. Said causing may, for example, be done electrically or pneumatically. In the following, individual control of the valves may be used synonymously with independent control of the individual valves.

It is conceivable that the second 2/2-way valve may have a larger maximum flow area than the first 2/2-way valve. However, it is also conceivable that the maximum flow cross-sectional area of the two valves may be the same. A flow cross-sectional area may be regarded as an area perpendicular to the direction of flow of the medium through which the medium flows. A different size may have the advantage that a larger variety of total flow cross-sectional areas may be realized. The total cross-sectional area may be considered to be the sum of the cross-sectional areas of the valves opened at a given time. The use of 2/2-way valves with flow cross sections of the same size may have the advantage that the variety of components may be reduced.

The flow area may be an intrinsic property of the respective 2/2-way valve. In a particularly advantageous variant, however, the flow cross-sectional areas of the respective 2/2-way valves may also be realized by one or more aperture plates. This means that the 2/2-way valves connected in parallel may differ only in the aperture plate used, in particular in the flow cross-sectional area released by this aperture plate, and otherwise be the same. The aperture plate(s) may be integrated into the 2/2-way valves or mounted externally. An aperture plate mask may also be provided to realize the different flow cross-sectional areas of several or all 2/2-way valves. The aperture plates or aperture plate mask may be provided downstream or upstream of a shut-off element of the 2/2-way valve, e.g. a valve spool.

It may be advantageous if the pressure control device has a pressure transmitter, whereby the pressure control device may be adapted to consider signals generated by the pressure transmitter as actual values or to determine an actual value on the basis of these signals. The use of a pressure transmitter may have the advantage that control and actuation of the valves may be carried out electrically.

It may be conceivable that the pressure transmitter may be connected to the atmosphere modifying station by a pressure measuring line, whereby the pressure measuring line has a length which may be less than 1 m, preferably less than 0.5 m, particularly preferably less than 25 cm. A short pressure measuring line may lead to more accurate measurement results, as it has a smaller volume, whereby the pressure applied to the pressure transmitter may differ from the pressure prevailing in the packaging. Furthermore, a shorter pressure measuring line may increase the reaction speed of the pressure control, since pressure changes in the packaging have a faster effect on the pressure transmitter.

Similarly, it may be advantageous if a pressure line between the 2/2-way valves and the atmosphere modifying station has a length which may be less than 1 m, preferably less than 0.5 m, particularly preferably less than 25 cm. In the case of gassing with possibly expensive exchange gases, the further advantage may be a reduced consumption of the exchange gas.

It may be particularly advantageous if the pressure control device has an additional 2/2-way valve, preferably two additional 2/2-way valves, particularly preferably three additional 2/2-way valves, which are connected parallel to each other and to the first and second 2/2-way valves and may be controlled independently of each other. By increasing the number of valves, the flexibility of the volume flow setting may be increased. On the other hand, a larger range of total flow cross-sectional areas may be covered.

It may be particularly advantageous if all 2/2-way valves have different flow cross-sections. As already mentioned above with reference to two 2/2-way valves with different flow cross-sections, this increases flexibility.

The flow cross-sectional area may also be an intrinsic property of the respective 2/2-way valves. In a particularly advantageous variant, the flow cross-sectional areas of the respective 2/2-way valves may be realized by one or more aperture plates. This means that the 2/2-way valves connected in parallel may differ only in the aperture plate used, in particular in the flow cross-sectional area left open by this aperture plate, and otherwise be the same. The aperture plate(s) may be integrated into the 2/2-way valves or mounted externally. An aperture plate mask may also be provided to realize the different flow cross-sectional areas of several or all 2/2-way valves. The aperture plate or aperture plate mask may be provided downstream or upstream of a shut-off element of the 2/2-way valve, e.g. a valve slide.

In another variant, a flow cross-sectional area of one of the 2/2-way valves may be twice as large as a flow cross-sectional area of the one of the 2/2-way valves with the next smaller flow cross-sectional area. In this way, a particularly efficient division of the spectrum of possible total flow cross-sectional areas may be ensured.

It may be conceivable that a volume flow set point or a volume flow set point profile may be set by an operator. The strength of the volume flow, for example, may be a decisive factor for the intended protection of the contents of the packaging. An excessive volume flow during evacuation may, for example, lead to lighter particles of the package contents, such as breadcrumbs or powdered sugar, being sucked out of the package. When gassing with a volume flow that is too high, such articles may be stirred up and negatively affect the appearance of the packaged goods and/or the quality of the sealed seam, e.g. by particles between two films hindering adhesion or melting. An adjustable volume flow set point or set point profile may facilitate prevention of such processes by adjusting the volume flow set point or the volume flow set point profile to the packaged products. The process speed and the accuracy of maintaining the desired pressure inside the packaging may also be influenced by appropriate selection. For example, a low volume flow set point at the beginning of the respective process may prevent light particles from being swirled up or sucked-off. A subsequent higher volume flow set point may ensure that the desired pressure is reached quickly. A subsequent deceleration of the volume flow may prevent the pressure within the packaging from being increased or decreased above or below the desired value (overshoot) and the desired pressure from being maintained as accurately as possible.

It may be particularly advantageous if the pressure control device may be configured to determine a volume flow set point profile based on user input. This may have the advantage that even less qualified operators may operate the packaging machine according to the invention. For example, a desired process speed and/or a desired fault tolerance and/or a weighting between process speed and fault tolerance may be regarded as user inputs. In this way, the operator may choose a high process speed for packaging contents without light components and a lower process speed for packaging contents with such components. A low desired error tolerance may be selected for packaging that is sensitive to excessive internal pressure, such as bursting. The respective parameters may be weighed against each other taking into account the above and other factors. The volume flow set point profile may be determined, for example, by selecting one of several preset characteristic curves that may be assigned to the respective user inputs. Alternatively, it may be conceivable that suitable calculation methods are stored in the pressure control device which considers the inputs made by the operator as input variables and output a suitable volume flow set point profile.

The invention also relates to a method for modifying an atmosphere within a package by a packaging machine with a pressure control device. This method may comprise generating a volume flow to or from the package and controlling the volume flow using the pressure control device. The method according to the invention may be characterized by the controlling of the volume flow comprising an individual opening and/or closing of one or more of at least two 2/2-way valves connected in parallel. This method offers advantages similar to those described above in relation to the packaging machine according to the invention.

It may be conceivable that the method further may comprise determining the evacuation and/or gassing pressure within the packaging based on signals generated by a pressure transmitter. Since, as explained above, various circumstances, such as the length of a pressure measuring line from the atmosphere modifying station to the pressure transmitter, may cause the pressure sensed by the pressure transmitter not to correspond at all times to the pressure prevailing in the package, the determination based on signals generated by the pressure transmitter may include, for example, the insertion of correction factors.

In another advantageous variant, the method may include determining a volume flow set point profile based on user input by an operator. Here, too, reference may be made for the sake of brevity to the advantages already explained with reference to the packaging machine according to the invention. Here, too, it may be particularly advantageous if the user inputs include a desired process speed and/or a desired error tolerance and/or a weighting between process speed and error tolerance.

In both the method according to the invention and the packaging machine according to the invention, for example, any combination of any values in a range between 0.1 mm and 10 mm$^2$ may be provided as flow cross-sectional areas. For example, any combination of any values in a range between 0.5 mm and 5 mm may be used as the diameter of the flow cross-sectional areas. Other aspects and advantages of the present invention will be apparent from the following detailed description of the preferred embodiments and the accompanying drawing figures.

DESCRIPTION OF THE SEVERAL VIEWS OF THE DRAWINGS

In the following, an advantageous embodiment of the present invention will be explained in more detail making reference to a drawing, in which the individual figures show.

DETAILED DESCRIPTION OF THE INVENTION

Figure 1:
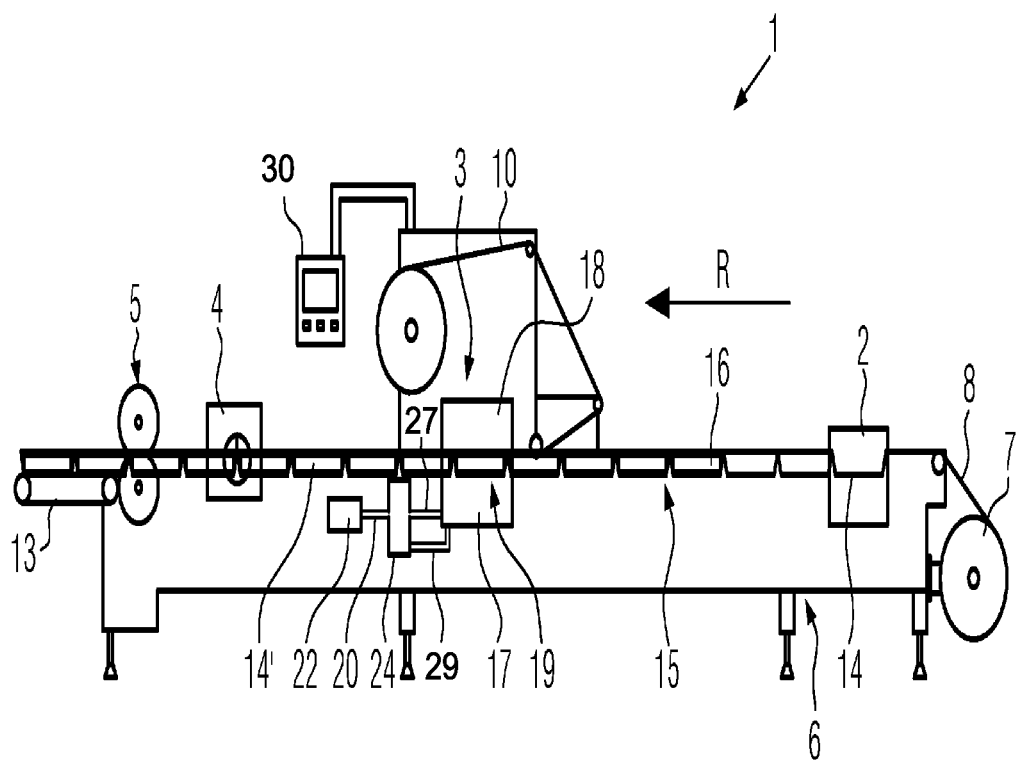
FIG. 1 is a schematic side view of one embodiment of a packaging machine in accordance with the teachings of the present invention, wherein the packaging machine is a thermoforming packaging machine.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a schematic view of a packaging machine 1 according to the invention, embodied, for example, as a thermoforming packaging machine. This packaging machine 1 may have a forming station 2, an atmosphere modifying station 3, e.g. a sealing station, a cross cutting device 4 and a longitudinal cutting device 5. These may be arranged in this order in a working direction R on a machine frame 6. On the input side there may be a feed roll 7 on the machine frame 6, from which a bottom film 8 may be pulled off. The bottom film 8 may be transported to the forming station 2 by a feed device, which is not shown. There, open packages 14 formed as troughs may be formed into the bottom film 8 by deep-drawing. A plurality of adjacent packages 14 may be formed. The open packages 14 may be transported together with the surrounding area of the bottom film 8 to a loading line 15, where they may be filled with the product 16. The filled packaging 14 may then be transported together with the surrounding area of the bottom film 8 to the atmosphere modifying station 3. Since this is a sealing station in this embodiment, they may be sealed there with a top film 10. Sealing the top film 10 onto the open packaging 14 produces sealed packaging 14', which may be separated with the cross cutting device 4 and the longitudinal cutting device 5 and transported away by a discharge device 13.

The shown sealing station 3 may include a sealing tool lower part 17 and a sealing tool upper part 18, which may interact to seal the packages 14. The sealing tool lower part 17 and/or the sealing tool upper part 18 may be heated for this purpose. After the packaging 14 to be sealed has been moved to a suitable position, the sealing tool lower part 17 and the sealing tool upper part 18 may be brought into a sealing position in which they form a chamber 19 surrounding the packaging 14. For this purpose, the sealing tool lower part 17, for example, may be liftable. Alternatively or additionally, the sealing tool upper part 18 could be lowered.

The sealing device 3 may include a channel 20 through which a package 14 to be sealed may be evacuated and/or gassed prior to sealing. This may be particularly advantageous when packaging food products, as their shelf life may be increased by vacuum packaging or by inert gases. In particular, it is conceivable that, after evacuation, the packaging 14 is filled with a protective gas, which may be selected according to the product to be packaged. A vacuum source, in this example a vacuum pump 22, may be connected to this channel 20 to generate a vacuum in channel 20. A gas source 21 (see FIG. 2), e.g. a pressure vessel filled with the desired gas, may be provided for gassing. In the present embodiment, both components are present, wherein the gas source 21 is only visible in FIG. 2. A switching device 23, e.g. a 3/2-way valve, may be used to switch between them, for example to first evacuate a package and then fill it with a gas supplied by the gas source 21.

Figure 2:
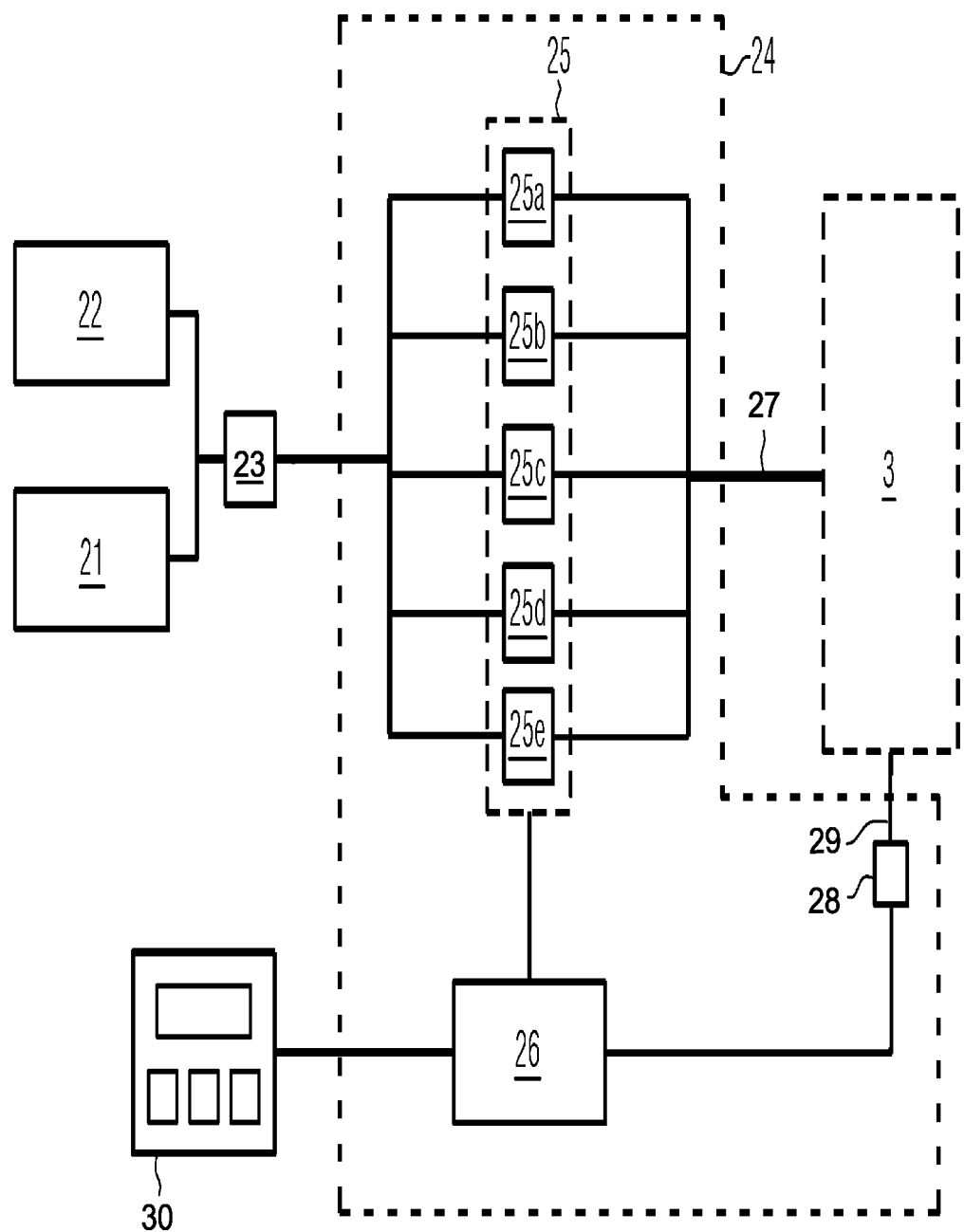
FIG. 2 is a schematic representation of components of one embodiment of a pressure control device and of other components of the packaging machine in accordance with the teachings of the present invention.

FIG. 2 shows the vacuum pump 22, the gas source 21, the switching device 23 and the atmosphere modifying station 3. FIG. 2 also schematically shows a pressure control device 24. Its connections to the other components of the packaging machine 1 are also schematically indicated. The pressure control device 24 comprises a plurality of 2/2-way valves 25. This includes a first 2/2-way valve 25a, a second 2/2-way valve 25b and three additional 2/2-way valves 25c, 25d, 25e. The pressure control device 24 may also include a control unit 26, as in the embodiment shown. This may be adapted to control the plurality of 2/2-way valves 25. For reasons of clarity, only one connection of the control unit 26 with the plurality of 2/2-way valves 25 is shown. However, it may also be provided that the individual 2/2-way valves 25a, 25b, 25c, 25d, 25e are each individually connected to the control unit 26. Alternatively or additionally, the individual 2/2-way valves 25a to e may be controlled independently of each other by the control unit 26. The plurality of 2/2-way valves may be connected to the atmosphere modifying station 3 by a pressure line 27.

The pressure control device 24 may also include a pressure transmitter 28 as shown in the embodiment. This may be connected via a pressure measuring line 29 to the atmosphere modifying station 3 to determine the pressure prevailing there and/or in the 14, 14' packaging. A pressure applied to the pressure transmitter 28 may be converted into an electrical signal by it. Based on this signal, the control unit 26 may determine an actual pressure value.

The control unit may also be connected to an operating unit 30 of the packaging machine. From there, it may receive user input entered by an operator. The user inputs may already include a volume flow set point or a volume flow set point profile. Alternatively, the control unit 26 may be configured to determine a volume flow set point or a volume flow set point profile from the received user inputs.

From the volume flow set point or the volume flow set point profile, a suitable transformation procedure may be used to determine how large the total flow cross-sectional area is to be at different times in the evacuation and/or gassing process. Suitable valve combinations, which provide these total flow cross-sectional areas when they are opened, may then be determined for the respective total flow cross-sectional areas. The control unit 26 may then open the determined valve combination at the corresponding time, for example the first valve 25a at the start of the process, then the first and second valves 25a, 25b and one of the additional valves, for example 25d, and towards the end of the process only the first valve 25a. Hysteresis may be used in the transformation process of the continuous volume flow set point profile into the discrete valve opening times in order to avoid unnecessary valve switching cycles.

From the foregoing, it will be seen that this invention is one well adapted to attain all the ends and objects herein-above set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging machine comprising:
    a forming station configured to form a package from a film;
    an atmosphere modifying station, in which an atmosphere within the package is modifiable by evacuation and/or gassing, wherein the atmosphere modifying station is disposed downstream of the forming station; and
    a pressure control device for modifying the atmosphere of the package, the pressure control device being configured to control an evacuation pressure and/or a gassing pressure, wherein the pressure control device comprises a first controllable 2/2-way valve and a second controllable 2/2-way valve which are arranged to influence at least one of the evacuation pressure or the gassing pressure by setting a volume flow, the first and second controllable 2/2-way valves are connected in parallel with one another and are independently controllable, wherein the pressure control device is configured to determine a volume flow set point profile, for an atmosphere modification process to be performed by the packaging machine, based on user inputs, and wherein the user inputs comprise one of a desired process speed, a desired fault tolerance, or a weighting between process speed and fault tolerance.

2. The packaging machine according to claim 1, wherein the second controllable 2/2-way valve has a larger maximum flow cross-sectional area than the first controllable 2/2-way valve.

3. The packaging machine according to claim 2, wherein a flow cross-sectional area of one of the first or the second controllable 2/2-way valves is twice as large as a flow cross-sectional area of that of the other one of the first and the second controllable 2/2-way valves.

4. The packaging machine according to claim 1, wherein the pressure control device comprises a pressure transmitter, the pressure control device being adapted to consider signals generated by the pressure transmitter as an actual value.

5. The packaging machine according to claim 4, wherein the pressure transmitter is connected to the atmosphere modifying station by a pressure measuring line to measure a pressure at the atmosphere modifying station, the pressure measuring line having a length that is less than one meter.

6. The packaging machine according to claim 1, wherein the pressure control device comprises at least a third controllable 2/2-way valve that is connected in parallel to the first and the second controllable 2/2-way valves and each of the controllable 2/2-way valves is actuatable independently of the others.

7. The packaging machine according to claim 1, wherein each of the controllable 2/2-way valves have a different flow cross-sectional area.

8. The packaging machine according to claim 1, wherein a pressure line is provided as a connection between the atmosphere modifying station and the first and the second controllable 2/2-way valves, the pressure line having a length which is less than one meter.

9. The packaging machine according to claim 1, wherein one of a volume flow set point or a volume flow set point profile can be set by an operator.

10. The packaging machine according to claim 1, wherein the forming station is configured to form the package as a trough by deep-drawing.

11. The packaging machine according to claim 1, wherein the pressure control device is configured to determine the volume flow set point profile by selecting a preset characteristic curve associated with the user inputs.

12. The packaging machine according to claim 1, wherein a calculation method is stored in the pressure control device, and the pressure control device is configured to determine the volume flow set point profile using the calculation method and the user inputs as input variables for the calculation method.

13. The packaging machine according to claim 1, wherein the pressure control device is configured to control the first and second controllable 2/2-way valves based on the volume flow set point profile so that both of the first and second controllable 2/2-way valves are open during a portion of the atmosphere modification process, and so that flow through both of the first and second controllable 2/2-way valves occurs at a same time and in a same direction.

14. The packaging machine according to claim 1, wherein the first and second controllable 2/2-way valves are connected to the atmosphere modifying station by a pressure line, the pressure control device is configured to open one of the first and second controllable 2/2-way valves at a first time during the atmosphere modification process based on the volume flow set point profile, and the pressure control device is configured to open both of the first and second controllable 2/2-way valves at a second time during the atmosphere modification process based on the volume flow set point profile, so that flow through the pressure line and both of the first and second controllable 2/2-way valves occurs at the second time.

15. The packaging machine according to claim 1, wherein the forming station is configured to form the package to receive a food product, wherein the volume flow set point profile includes a first volume flow set point for a beginning of the atmosphere modification process, and a second volume flow set point for a subsequent portion of the atmosphere modification process, and wherein the first volume flow set point is lower than the second volume flow set point to inhibit particles of the food product from being swirled up or sucked-off during the atmosphere modification process.

16. The packaging machine according to claim 1, wherein the volume flow set point profile includes different volume flow set points for different times during the atmosphere modification process to be performed by the packaging machine.

17. The packaging machine according to claim 1, wherein the volume flow set point profile includes a first volume flow set point for a beginning of the atmosphere modification process, a subsequent second volume flow set point that is higher than the first volume flow set point, and a subsequent third volume flow set point that is lower than the second volume flow set point.

18. A method for modifying an atmosphere within a package by a packaging machine having a pressure control device, the method comprising:
    forming the package from a film in a forming station of the packaging machine;
    determining a volume flow set point profile, for use in modifying the atmosphere within the package, using the pressure control device and based on user inputs entered by an operator;
    generating a volume flow to the package or away from the package; and
    controlling the volume flow based on the volume flow set point profile using the pressure control device;
    wherein controlling the volume flow step comprises opening and/or closing one or more of at least two 2/2-way valves connected in parallel, and independently actuating at least one of the at least two 2/2-way valves relative to another one of the at least two 2/2 way valves, and wherein the user inputs comprise one of a desired process speed, a desired fault tolerance, or a weighting between process speed and fault tolerance.

19. The method according to claim 18, further comprising the step of determining the evacuation and/or gassing pressure prevailing within the package based on signals generated by a pressure transmitter.

20. The method according to claim 19, wherein the pressure control device comprises at least a third 2/2-way valve that is connected in parallel to the at least two 2/2-way valves and each of the 2/2-way valves are actuated independently of the other 2/2 way valves.

21. The method according to claim 18, wherein the user inputs comprise the desired fault tolerance, or the weighting between process speed and fault tolerance.

22. A packaging machine having an atmosphere modifying station, in which an atmosphere within a package to be produced is modifiable by evacuation and/or gassing, the packaging machine comprising:
    a pressure control device for modifying the atmosphere of a package, the pressure control device being configured to control an evacuation pressure and/or a gassing pressure, wherein the pressure control device comprises a first controllable 2/2-way valve and a second controllable 2/2-way valve which are arranged to influence at least one of the evacuation pressure or the gassing pressure by setting a volume flow, the first and second controllable 2/2-way valves are connected in parallel with one another and are independently controllable, wherein the pressure control device is configured to determine a volume flow set point profile based on user inputs, and wherein the user inputs comprise one of a desired fault tolerance, or a weighting between a process speed and fault tolerance.

23. The packaging machine according to claim 22 further comprising a forming station configured to form the package from a film, wherein the forming station is disposed upstream of the atmosphere modifying station.

24. The packaging machine according to claim 23, wherein the forming station is configured to form the package as a trough by deep-drawing.

* * * * *